(12) United States Patent
Goetz

(10) Patent No.: US 8,677,645 B2
(45) Date of Patent: Mar. 25, 2014

(54) LENGTH MEASURING SYSTEM

(75) Inventor: Klaus-Dieter Goetz, Sersheim (DE)

(73) Assignee: Schneeberger Holding AG (CH)

( * ) Notice: Subject to any disclaimer, the term of this patent is extended or adjusted under 35 U.S.C. 154(b) by 451 days.

(21) Appl. No.: 12/991,489

(22) PCT Filed: May 8, 2009

(86) PCT No.: PCT/CH2009/000148
§ 371 (c)(1),
(2), (4) Date: Jan. 24, 2011

(87) PCT Pub. No.: WO2009/135331
PCT Pub. Date: Nov. 12, 2009

(65) Prior Publication Data
US 2011/0271539 A1    Nov. 10, 2011

(30) Foreign Application Priority Data

May 8, 2008   (DE) .................... 20 2008 006 293 U

(51) Int. Cl.
*G01B 7/02*    (2006.01)
(52) U.S. Cl.
USPC .......................................................... 33/708
(58) Field of Classification Search
USPC .......................................................... 33/708
See application file for complete search history.

(56) References Cited

U.S. PATENT DOCUMENTS

| | | | |
|---|---|---|---|
| 4,316,081 A | 2/1982 | Washizuka et al. | |
| 4,747,215 A | 5/1988 | Waikas | |
| 5,488,782 A * | 2/1996 | Ochiai | 33/708 |
| 5,743,021 A | 4/1998 | Corcoran | |
| 6,163,970 A * | 12/2000 | Nelle et al. | 33/482 |
| 6,332,278 B1 * | 12/2001 | Bezinge et al. | 33/784 |
| 6,563,303 B1 | 5/2003 | Watkins | |
| 6,564,468 B2 * | 5/2003 | Blattner et al. | 33/706 |
| 6,675,491 B2 * | 1/2004 | Sasaki et al. | 33/706 |
| 6,701,634 B2 * | 3/2004 | Henshaw et al. | 33/706 |
| 6,772,531 B1 * | 8/2004 | Henshaw et al. | 33/706 |
| 7,726,038 B2 * | 6/2010 | Reusing | 33/706 |
| 2010/0162582 A1 * | 7/2010 | Shiao et al. | 33/708 |

FOREIGN PATENT DOCUMENTS

| | | |
|---|---|---|
| FR | 2 651 877 | 3/1991 |
| JP | 55 122103 | 9/1980 |
| JP | 57 156517 | 9/1980 |
| WO | WO 89/02570 | 3/1989 |

OTHER PUBLICATIONS

International Search Report Application No. PCT/CH2009/000148, dated Mar. 9, 2010.

* cited by examiner

*Primary Examiner* — Christopher Fulton
(74) *Attorney, Agent, or Firm* — Venable LLP; Jeffri A. Kaminski

(57) ABSTRACT

The invention relates to a measurement element (1, 11, 17, 26) for a length measuring system (40) in the form of a flexible strip comprising a measurement body (4) that can be scanned using a measuring unit (41) of the respective length measuring system (40). The flexible strip consists of a non-magnetic first layer (2, 13, 19, 28) and a magnetizable second layer (3, 14, 20, 29). The first layer (2, 13, 19, 28) is designed as a strip consisting of a metal material, coated at least in part on one side with the second layer (3, 14, 20, 29), said first layer acting as a support layer for the second layer. The second layer (3, 14, 20, 29) comprises several magnetizable regions that form the measurement body (4).

13 Claims, 3 Drawing Sheets

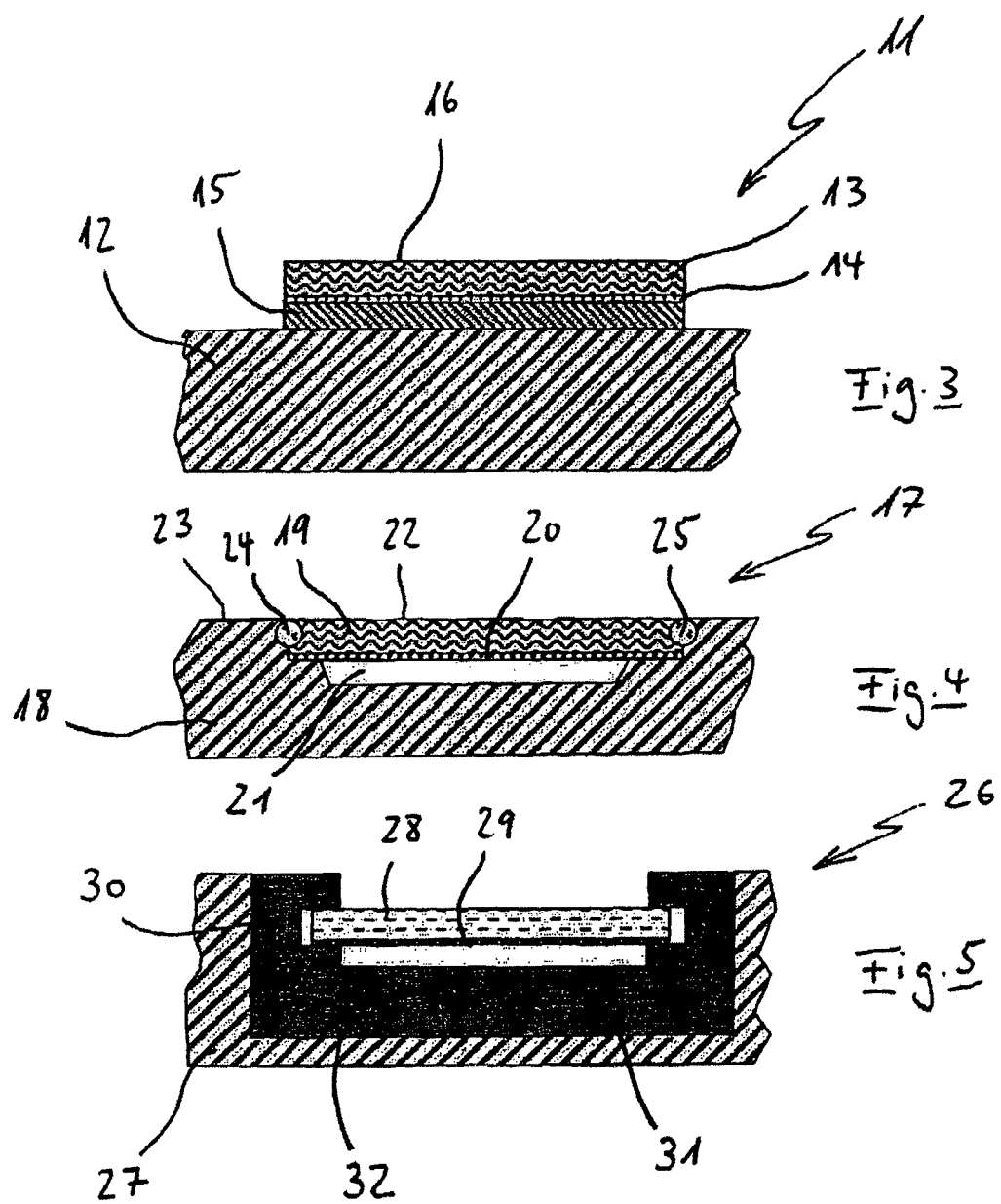

LENGTH MEASURING SYSTEM

CROSS-REFERENCE TO RELATED APPLICATIONS

This application is a National Stage Application of PCT/CH2009/000148, filed May 8, 2009, which designates the United States and claims the priority of German Patent Application No. 20 2008 006 293.4, filed on May 8, 2008.

BACKGROUND

1. Field of Invention

The invention relates to a length measuring system with a measurement element in the form of a flexible strip and comprises a measurement body which can be scanned with a measuring unit of the respective length measuring system.

2. Related Art

Strip-like measurement elements which consist of plastic and have a multiplicity of magnetisable particles which are embedded in the plastic are known from the prior art. These elongate measurement elements are generally provided with a measurement body which can for example comprise a length code or a sequence of equidistant position markings. The measurement body is generally produced by magnetising individual regions of the respective measurement element. To detect the respective length measurement data or position information, a measuring unit with a reading head is for example used for scanning the measurement body, the respective reading head generally proceeding by contactless scanning at a relative distance from the measurement element. The measurement element can generally be fixed by means of an adhesive connection to a support structure which holds the measurement element in a predefined spatial arrangement. Attachment by means of an adhesive connection is however disadvantageous in that permanent secure positioning of the measurement element on the support structure cannot be guaranteed. Although measurement elements consisting of plastic are protected from wear by the contactless scanning, the necessary minimum distance between the measurement element and the reading head means that the accuracy of the respective length measurement or determination of position is limited, especially as the magnetised regions of the measurement element which contain length information or position information must generally have a minimum size so that they can be reliably scanned by the respective reading head from a predefined distance.

Furthermore, optical systems or strips are known from the prior art in which the measurement strip is scanned optically by a scanning unit in order to acquire length measurement data contactlessly. The disadvantage of these measurement strips is however that the measurement strip can become very dirty, as a result of which error-free scanning by the optical scanning unit can no longer be reliably ensured.

SUMMARY

The present invention relates to creating a length measuring system with which the said disadvantages can be avoided and which is furthermore virtually maintenance-free.

A measurement element is in the form of a flexible strip and comprises a measurement body which can be scanned with a measuring unit of the respective length measuring system, the flexible strip consisting of a non-magnetic first layer and a magnetisable second layer.

According to an embodiment of the invention, the first layer is configured as a strip consisting of a metallic material which is coated at least in part on one side with the second layer and acts as a support layer for the second layer. The second layer furthermore comprises a plurality of magnetised regions which form the measurement body.

As the measurement element is in the form of a flexible strip, it can be supposed in this connection that the metallic strip which forms the first layer is likewise flexible. The mechanical strength of the material of the first layer and the geometrical dimensions of the first later are selected correspondingly.

Several advantages are achieved by the fact that the second layer is applied to a support layer consisting of a metallic material. Metallic materials have relatively high mechanical strength and relatively good resistance to wear (for example to wear by abrasion), in particular compared with plastics suitable for the production of flexible strips. Consequently, it is possible to select the thickness of the first layer to be relatively small (the first layer can for example be a thin metallic foil). Thanks to the small thickness of the first layer, it becomes possible to scan the measurement body formed in the second layer (in the form of a plurality of magnetised regions) by means of a measuring device which is suitable for detecting the magnetised regions in the second layer which form the measurement body, from the side of the first layer opposite the second layer, and in particular through the first layer, and to achieve relatively large measurement signals in the process. Thanks to the relatively high wear resistance of the metallic material, it is also possible when scanning the measurement body to bring the respective measuring device into mechanical contact with the first layer and to guide it in a touching manner along the surface of the first layer without touching the second layer and without damaging the second layer. In the process it is also ensured that the measuring device always has a distance from the second layer or from the measurement body, which is defined by the respective thickness of the first layer. If the thickness of the first layer is maintained within predefined tolerances over the entire length of the measurement element, the distance between the measuring device and the second layer or the measurement body can in this manner be controlled correspondingly precisely over the entire length of the measurement element. The latter improves the accuracy of the scanning of the measurement body by means of the respective measurement device.

For example, the measurement body can be produced by magnetic methods in the second (magnetisable) layer. The structure of the measurement body can for example consist of two magnetisable tracks: an incremental track consisting of a succession of magnetised regions with different polarities (north or south poles) and with an identical width of for example approx. 200 µm, and a reference track for determining an absolute position, the reference track being provided with distance-coded markers or with reference markers for identifying one or a plurality of predefined positions.

The measurement body of the measurement element can be scanned with a measuring unit which contains a sensor which is sensitive to the magnetic fields emanating from the magnetised regions. A magnetoresistive sensor is for example suitable as the sensor, the change in field strength in a magnetoresistive sensor material during a relative movement between the sensor and the measurement body resulting in a measurable change in the electrical resistance.

The first layer can preferably consist of a wear-resistant, abrasion-resistant, hard and/or corrosion-resistant material, in particular steel or a steel alloy. This first layer acts as a wear-resistant covering or protective layer for the second layer and protects the magnetisation from subsequent change by mechanical or chemical influences.

In a development of this embodiment, it is provided for the (magnetisable) second layer to be based on galvanic deposition of an alloy layer, in particular on galvanic production of cobalt alloy-based layers. Galvanic deposition of metallic layers is in particular suitable for economical mass production at comparatively low cost and high throughput. Cobalt alloys in turn have the advantage that a particularly robust and corrosion-resistant layer can be created. Other alloy layers are of course also conceivable, with which a robust magnetisable layer can be created. In this case the first layer acts as a support layer for the second layer. A prefabricated, flexible, metallic strip can for example be used as the first layer.

In order to scan the measurement body by means of a measuring unit or sensor, the first layer of the measurement element can preferably face the measuring unit or the respective sensor. The measurement body can then be scanned through the first layer. The measuring unit or the respective sensor for scanning the measurement body can in particular be guided in a touching manner over the first layer during scanning, the measuring unit or sensor not coming into contact with the second layer or the measurement body. The measuring unit or the respective sensor of the measuring unit can in this manner be guided at a constant distance from the second layer and thus from the measurement body. This allows reliable scanning of the measurement body with a high degree of measuring accuracy. As scanning takes place without mechanical contact with the second layer, scanning is not connected with any wear at all for the second layer.

Several options are conceivable for fixing the measurement element to a support structure in the environment of the length measuring system. For example, the measurement element can be fixed to the support structure by means of a double-sided adhesive strip.

It is advantageous in particular in the case of a metallic first layer (support layer) to weld the measurement element to the support structure or to adhesively bond it thereon. A welded connection has the advantage compared to an adhesive fixing method that the connection is resistant to cooling lubricants, solvents or lubricants.

Clamped, soldered, screwed or else rolled connections are also conceivable to connect the measurement element to a support structure in the environment of the length measuring system, to name just a small further selection.

The measurement element can be arranged in principle in any desired manner on the support structure, for example lying flat, upright or running in a circular manner. The respective arrangement or orientation can for example follow the measuring unit to be used.

BRIEF DESCRIPTION OF THE DRAWINGS

Exemplary embodiments of the invention are explained in more detail below using the drawings. In the figures:

FIG. 3 shows a schematically illustrated first fixing option;

FIG. 4 shows a schematically illustrated second fixing option;

FIG. 5 shows a schematically illustrated third fixing option.

DETAILED DESCRIPTION

Figures 1, 2:
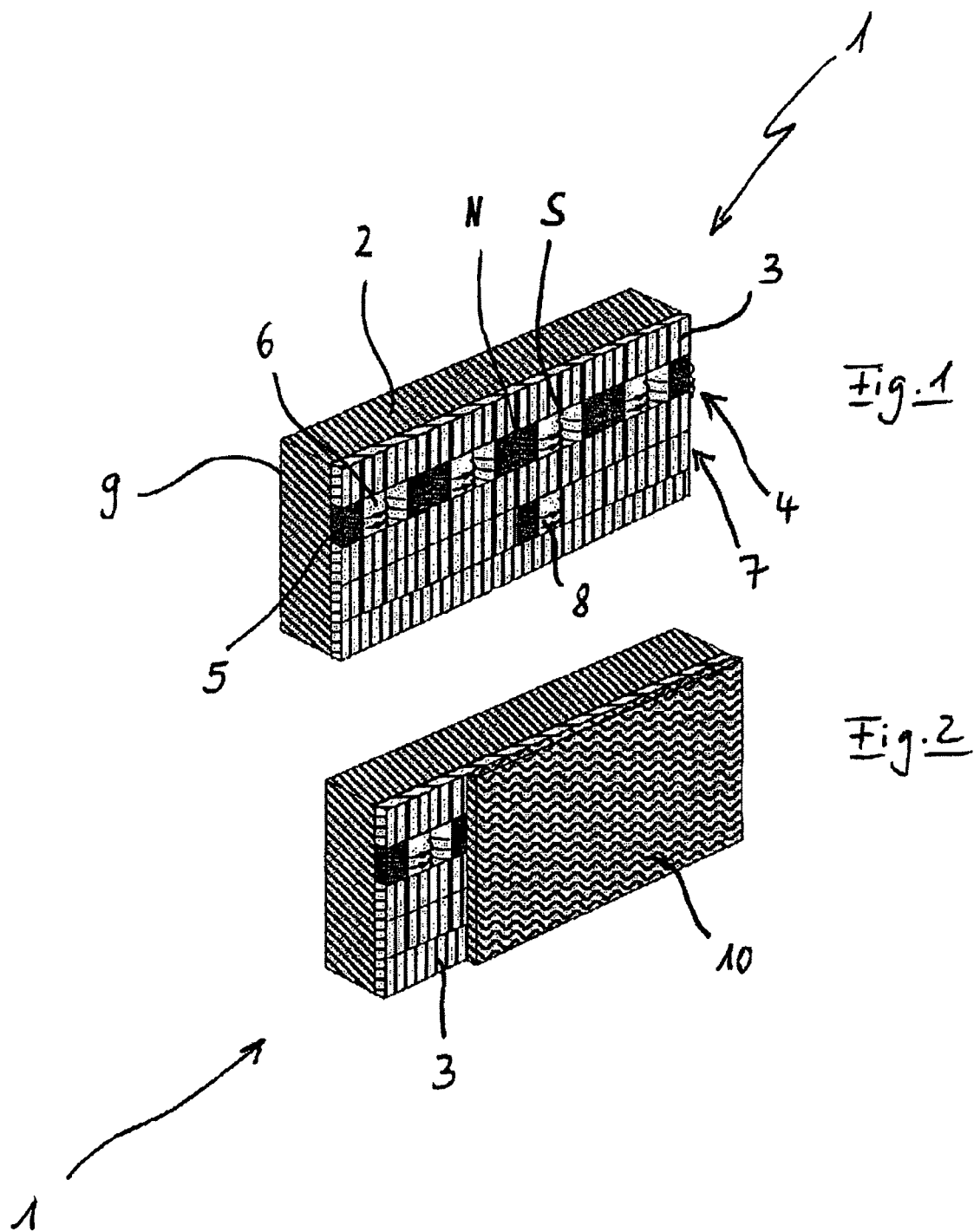
FIG. 1 shows a schematic illustration of a longitudinal section of a measurement element according to an embodiment of the invention.
FIG. 2 shows the measurement element according to FIG. 1 with a fixing element fixed thereon.

FIG. 1 shows the schematic illustration of a longitudinal section of a measurement element 1 according to an embodiment of the invention. The measurement element 1 is configured as an elastically pliable or flexible measurement strip. The measurement element 1 consists essentially of a first non-magnetic layer 2, consisting of a metallic material, and a second magnetisable layer 3.

The first (non-magnetic) layer 1 covers the second (magnetisable) layer 3 completely, at least from one side. A measurement body 4 is formed in the second layer 3 by means of a magnetic method. The measurement body 4 consists in the present example of an incremental track 5 consisting of approx. 200 µm-wide magnetised regions 6, which are arranged with alternating polarity (north and south poles) in the longitudinal direction of the measurement element 1, and a reference track 7 for determining the absolute position, the reference track 7 being provided with distance-coded markers 8. To produce the incremental track of the measurement body 4, magnetic fields with in each case different directions are applied for example in different regions of the second layer 3, so that a spacing consisting of magnetic north and south poles (N, S) is produced with a spacing period of approx. 200 µm. In the case of the reference track 7, predefined absolute positions are identified correspondingly with magnetic markers.

The first layer 2 is configured as a wear-resistant support layer or protective layer for the second layer 3. The first layer 2 can for example be formed as a flexible strip consisting of a wear-resistant metal (for example steel), whereas the second layer 3 can be produced by coating one side of this strip, for example by galvanic coating.

To scan the measurement body 4, a suitable measuring unit (not shown in FIG. 1), for example a reading head with a magnetoresistive sensor, can be brought into contact with the surface 9 of the first layer 2 opposite the second layer 3, it being possible for the measuring unit to be moved along the surface 9 and constantly in contact with the surface 9 during scanning. The second layer 3 and thus the measurement body 4 is largely protected from mechanical influences and thus from mechanical wear by this arrangement.

It is therefore advantageous to fix the measurement element 1 with the hard, wear-resistant and preferably corrosion-resistant first layer 2 to a support structure for the measurement element 1 such that it points outwards, the first layer 2 facing the respective measuring unit for scanning the measurement body 4.

FIG. 2 shows the measurement element 1 with a fixing element fixed thereon. The fixing element 10 is a double-sided adhesive strip. The double-sided adhesive strip is fixed to the magnetisable second layer 3 and is used to fix the measurement element 1 to a suitable support structure.

FIG. 3 shows a first option for fixing a measurement element 11 according to an embodiment of the invention to a support structure 12. The measurement element 11 consists of a first non-magnetic layer 13 consisting of a metallic material and of a second magnetisable layer 14 with a measurement body 4. An adhesive strip 15 is arranged under the second layer 14. The measurement element 11 can be fixed to the support structure 12 by means of the adhesive strip 15. The measuring unit for scanning the measurement body 4 would proceed in a touching manner on the outer side 16 of the first layer 13 without touching the second layer 14. The measurement body 4 in the second layer 14 is accordingly scanned through the first layer 13.

FIG. 4 shows a second option for fixing a measurement element 17 according to an embodiment of the invention to a support structure 18. The measurement element 17 again has a first non-magnetic layer 19 consisting of a metallic material and a magnetisable second layer 20 with a measurement body 4. The support structure 18 has a channel-like recess 21 in which the measurement element 17 is arranged. The outer side 22 of the first layer 19 is arranged flush with the upper side 23 of the surrounding structure 18. The measurement element 17 or the first layer 19 is connected by welded points 24, 25 or adhesively bonded to the support structure 18.

FIG. 5 shows a third option for fixing a measurement element 26 according to an, embodiment of the invention to a support structure 27. The measurement element 26 has a first layer 28 consisting of a metallic material and a magnetisable second layer 29 with a measurement body 4. The measurement element 26 is arranged in a groove 30 of a fixing rail 31, the fixing rail 31 being fixed in a recess 32 in the support structure 27. As in the embodiments shown in FIGS. 3 and 4, the first layer 28 is situated on an outer side, the measurement body 4 in the second layer 29 being scanned through the first layer 28.

The fixing options shown here are only a small selection of the possible fixing options.

Figure 6:
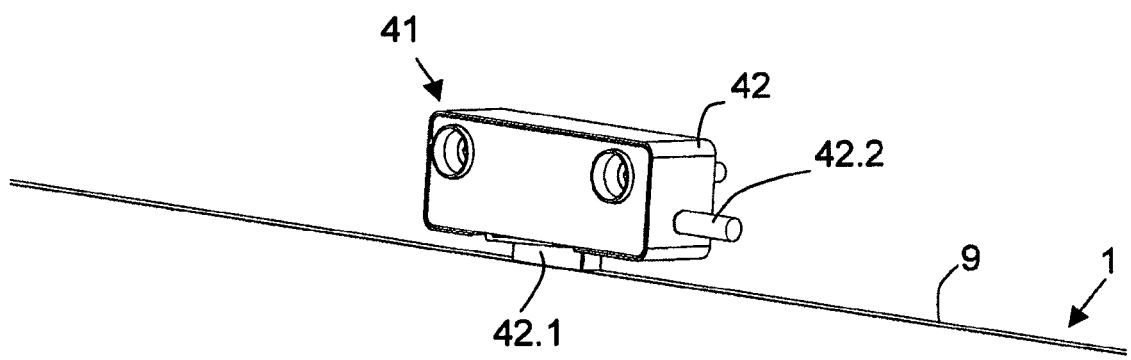
FIG. 6 shows a schematic illustration of a length measuring system with a measurement element according to FIG. 1 and a measuring unit for scanning the measurement body.

FIG. 6 shows a length measuring system 40 according to an embodiment of the invention which comprises the measurement element 1 according to FIG. 1 and a measuring unit 41. The measuring unit 41 comprises a reading head 42, which can be moved along the measurement element 1 and is intended for scanning the measurement body 4. The reading head 42 has a sensor 42.1, which touches the surface 9 of the first layer of the measurement element 1 and produces an electrical signal which depends on the respective local magnetisation of the second layer 3 of the measurement element 1. The reading head is guided along the measurement element 1 during a movement (with a movement guide not shown in FIG. 6) in such a manner that the sensor 42.1 remains constantly in contact with the surface 9 of the first layer. The sensor 42.1 can for example be a magnetoresistive sensor or another sensor which is sensitive to the respective magnetisation of the second layer 3. The reading head 42 further comprises evaluation electronics which evaluate the respective signals of the sensor 42.1 and forward results of the evaluation, for example information on the current position of the reading head 42 with respect to the measurement element 1 or the length of a path covered by the reading head 41, via a connecting line 42.2 to a control unit (not shown).

The invention claimed is:

1. A length measuring system comprising:
   a measurement element in the form of a flexible strip comprising a non-magnetic first layer and a magnetisable second layer, the second layer comprising a plurality of magnetised regions defining a measurement body; and
   a measuring unit comprising a sensor sensitive to magnetic fields and configured to be moved along the measurement element to scan the measurement body,
   wherein the first layer comprises a metallic material and supports the second layer, wherein the first layer includes a first outer side and a second outer side opposite the first outer side, wherein the first outer side of the first layer is coated at least in part with the second layer, wherein the second layer comprises a metal or an alloy and is galvanically deposited on the first layer and wherein the sensor is arranged on and moved along the second outer side of the first layer whereby the sensor scans the measurement body through the first layer.

2. The length measuring system according to claim 1, wherein the measurement body is produced by magnetic methods in the magnetisable second layer.

3. The length measuring system according to claims 1, wherein the first layer comprises a wear-resistant, abrasion-resistant, hard and/or corrosion-resistant metallic material.

4. The length measuring system according to claim 3, wherein the first layer comprises steel or a steel alloy.

5. The length measuring system according to claims 1, wherein the first layer is configured as a protective layer for the second layer.

6. The length measuring system according to claim 1, wherein the measurement element is fixed to a support structure by a materially cohesive connection.

7. The length measuring system according to claim 6, wherein the materially cohesive connection comprises an adhesive, a soldered or a welded connection.

8. The length measuring system according to claims 1, wherein the measurement element is fixed to a support structure by a releasable connection.

9. The length measuring system according to claim 8, wherein the releasable connection comprises a screwed, a plugged or a clamped connection.

10. The length measuring system according to claim 1, further comprising a movement guide configured to guide the measuring unit in a touching manner over the first layer to scan the measurement body.

11. The length measuring system according to claims 1, wherein the measurement element is arranged on a support structure with the first layer facing outwards.

12. The length measuring system according to claim 11, wherein the measurement element is fixed to the support structure by a welded connection.

13. The length measuring system according to claim 12, wherein the first layer is welded to the support structure.

\* \* \* \* \*